Jan. 8, 1946. H. BENZ ET AL 2,392,520
COMBINED HYDRO-MECHANICAL GEAR
Filed Aug. 5, 1941 4 Sheets-Sheet 1

Inventors
FRITZ KUGEL,
HELMUT BENZ,
By
Attorneys

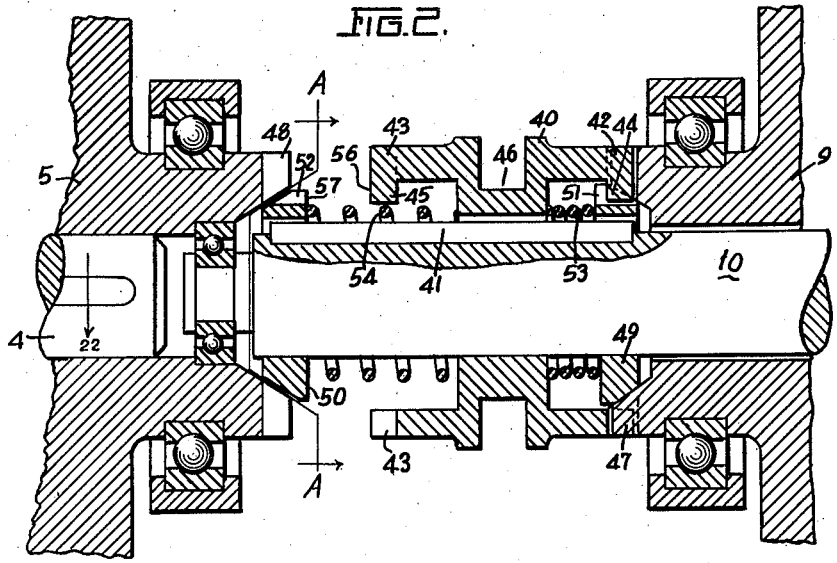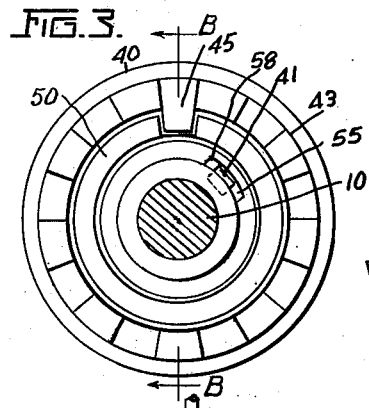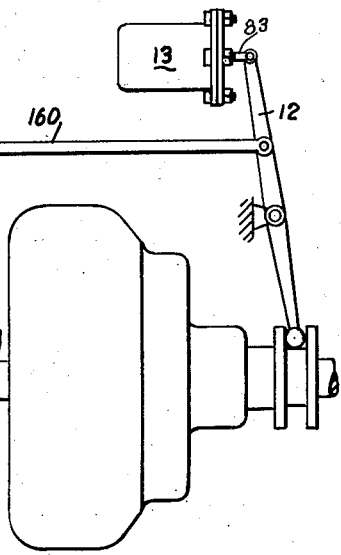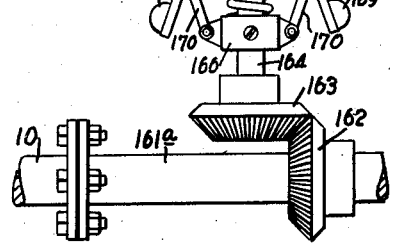

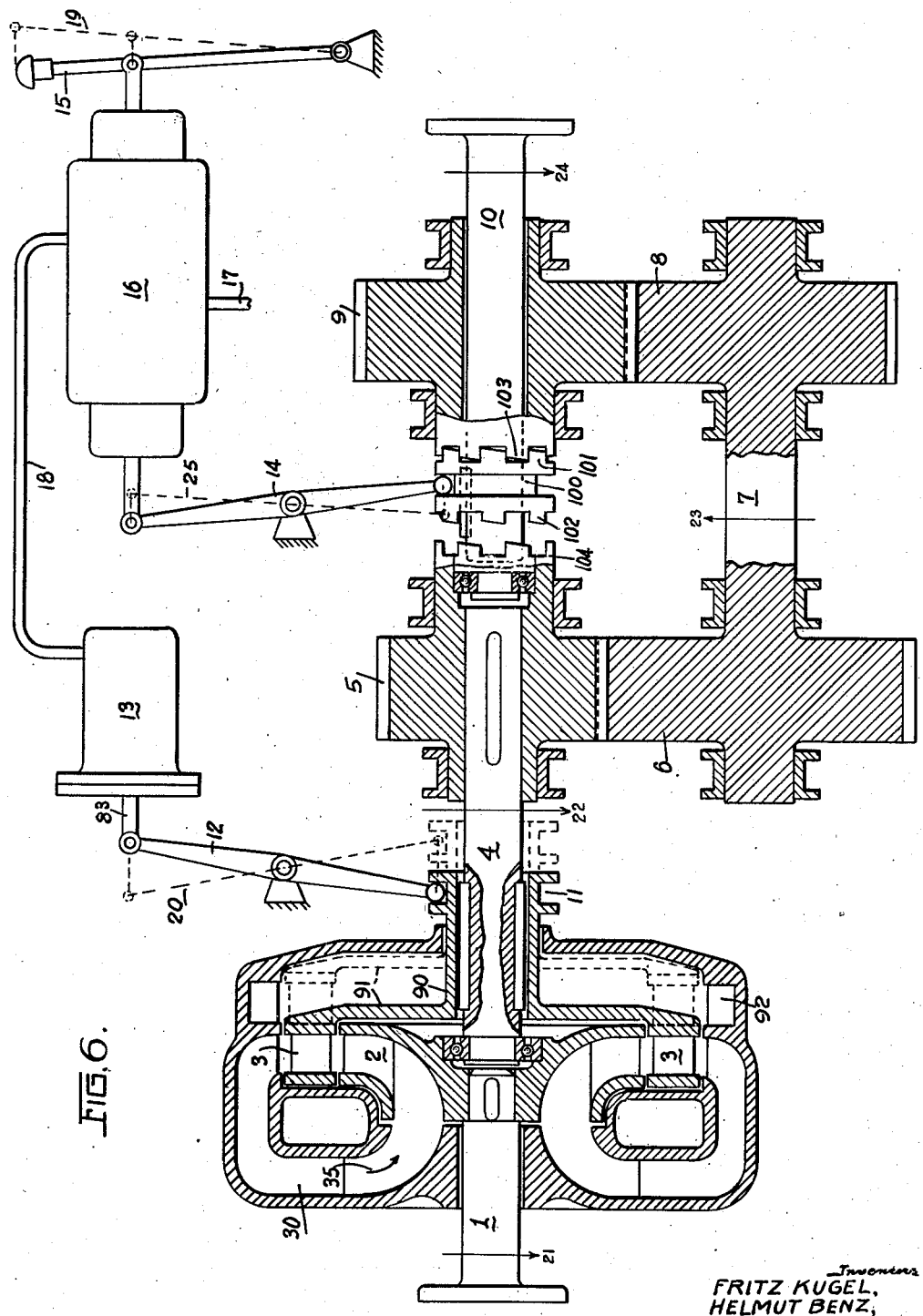

Jan. 8, 1946.   H. BENZ ET AL   2,392,520
COMBINED HYDRO-MECHANICAL GEAR
Filed Aug. 5, 1941   4 Sheets-Sheet 4

Inventors
FRITZ KUGEL,
HELMUT BENZ.

Patented Jan. 8, 1946

2,392,520

UNITED STATES PATENT OFFICE 2,392,520

COMBINED HYDROMECHANICAL GEAR

Helmut Benz and Fritz Kugel, Heidenheim, Brenz, Germany; vested in the Alien Property Custodian Application August 5, 1941, Serial No. 405,540
In Germany August 8, 1940

7 Claims. (Cl. 74—189.5)

This invention relates to power transmissions and, in particular, to hydromechanical compound power transmissions comprising a hydraulic transmission and a gear change transmission system. The hydraulic transmission may comprise one or a plurality of hydraulic circuits, which may be torque converters or couplings. The gear system for such a combination usually has positive speed changing elements which are brought into engagement with each other only at the attainment of equal or substantially equal speeds.

With such compound transmissions, it is known to arrange between the hydraulic power transmission and the gear change transmission system a positive coupling which may be made ineffective at any desired time in order, when effecting a speed change, to release the last effective speed transmission elements, and to make it possible to equalize the speed of the transmission elements to be made effective independently of the starting speed of the hydraulic system.

It is also known to employ for this purpose a special equalizing mechanism comprising a friction clutch to produce acceleration and a friction brake for the purpose of retardation of the transmission elements.

Furthermore, it is known in a hydraulic circuit to interrupt the conveying of power from the primary side to the secondary side by employment of an annular slide valve or by the shifting of shiftable blades so that the flow of fluid is impeded. It is also possible to interrupt the conveying of power above referred to by withdrawing the pump or turbine wheel in an axial direction from the hydraulic circuit. Such and similar devices are included in the term "disconnecting mechanism."

This invention relates to hydromechanical compound power transmission systems, in which at least one hydraulic circuit is provided with such disconnecting mechanism.

One of the objects of the present invention is the provision of a hydromechanical compound power transmission, which will make it possible to eliminate special equalizing mechanisms heretofore required in order to enable a proper change from one speed to another. This problem has been solved according to the present invention by starting from the fact that the ratio between the primary and secondary speed, at the time of effecting a speed change, is such that an axially movable turbine wheel of a torque converter, when in its fully withdrawn position, not only receives no driving torque but actually receives a braking torque. This phenomenon is, of course, also present with a converter having an annular slide valve or shiftable blades.

The torque converter with disconnecting mechanism therefore constitutes an extremely adaptable element which makes it possible to create, at the output shaft of the torque converter, any desired torque between a full positive value and a small negative value.

Also a hydraulic coupling may be regulated in the same manner within a narrower range, i. e., between the full positive and a small negative fractional value. This simple adjustability of the torque output for equalizing the speeds of the transmission elements to be engaged for effecting a speed change is made use of according to the invention by means adapted to move the disconnecting mechanism into various positions as required. Such an arrangement makes it possible not only to eliminate mechanical equalizing mechanisms and their complicated control systems, but also does away with the arrangement of a friction clutch between the hydraulic transmission and the gear transmission. In other words, all elements subject to wear are eliminated.

When employing a shiftable turbine wheel, the input of power into the hydraulic circuit remains unchanged in the disconnecting position of the disconnecting mechanism, so that the motor remains unaffected by the conditions on the output side of the hydraulic system and no particular control of the motor is required.

With other constructions, for instance, annular slide valves, a reduction in the power input into the hydraulic circuit may occur when the disconnecting mechanism is in its disconnecting position.

It is, therefore, a further object of the invention, under such conditions, to prevent variations in the speed of the motor. This problem is solved according to the invention by the provision of means associated with the disconnecting mechanism for appropriately reducing the supply of fuel to the motor.

It is also an object of the invention to provide an additional braking effect in cases where the normal braking effect of the disconnecting mechanism in its braking position is not quite sufficient. To this end, according to the invention, the blade arrangement of the hydraulic converter may be varied so as to cause such an additional braking effect. If this is not possible, an auxiliary mechanism, for instance, a stationary blade assembly may be provided for creating a sufficiently great braking torque.

If there is insufficient braking effect, when using a hydraulic coupling, the invention provides an additional braking mechanism, which becomes operative in connection with the disconnecting mechanism so that during a portion of the stroke of the disconnecting mechanism, a negative torque is exerted upon the output shaft.

In the following specification, the end position of the disconnecting mechanism for complete unimpeded circulation of the fluid is designated as the "in-position."

The opposite end position of the disconnecting mechanism is designated as the "braking-position," and the position between the in-position and the braking-position, at which no torque is exerted upon the turbine wheel, is designated as the "neutral-position."

In order to speed up the equalization of the speeds of speed transmission elements to be interengaged, the invention provides means adapted, during the time required for the said equalization, to maintain the disconnecting mechanism in a definite position between the in-position and the neutral-position.

According to the invention it is also made possible to cause the disconnecting mechanism to move from the neutral-position, either with equal speed, or in the neighborhood of the neutral-position at a lower speed, and then later at a greater speed in order to prevent too fast an increase in speed and the risk of shocks caused thereby.

If desired, according to the invention, it is also possible, during the disconnecting operation, to brake at the neutral position and to allow movement to the braking-position only when this is required by the speed change operation.

It is a further object to provide a simplified control for a hydraulic compound power transmission, which will make it possible to effect a speed change merely by adjusting a pre-selecting lever without further adjustments. This problem is solved according to the invention by controlling the disconnecting mechanism in accordance with the difference between that position of the preselecting mechanism, which is hereinafter referred to as the "x-position" of the clutch sleeve, and the actual position of the clutch sleeve, which is hereinafter referred to as the "actual-position" thereof. The disconnecting mechanism carries out its disconnecting stroke until the control mechanism exerts an impulse for movement in the opposite direction.

These and other objects and advantages of the invention will appear more clearly from the following specification taken in connection with the accompanying drawings, in which:

Figure 2 is a fragmentary longitudinal section along the line 2—2 of Figure 3 showing on an enlarged scale the jaw clutch members associated with the gear change transmission system.

Figure 3 is a transverse section along the line 3—3 of Figure 2.

Figure 4 is a fragmentary side elevation showing an additional feature which may be used in connection with the arrangement of Figure 1.

Figure 5 is a fragmentary side elevation showing another additional arrangement which may be used in connection with the arrangement of Figure 1.

Figure 6 is a longitudinal sectional view of a further embodiment of the invention involving a torque converter with an axially movable turbine wheel, and a gear change transmission system having jaw clutch elements with slant front faces.

Figure 7 is a similar view of a still another embodiment of the invention comprising a hydraulic transmission system with torque converter and hydraulic coupling, the turbine wheel of the latter being provided with shiftable blades, and a gear change transmission system provided with a threaded sleeve supporting the jaw clutch elements.

Figure 8 is a fragmentary detail of Figure 7 showing the parts in a different position.

Figure 1:
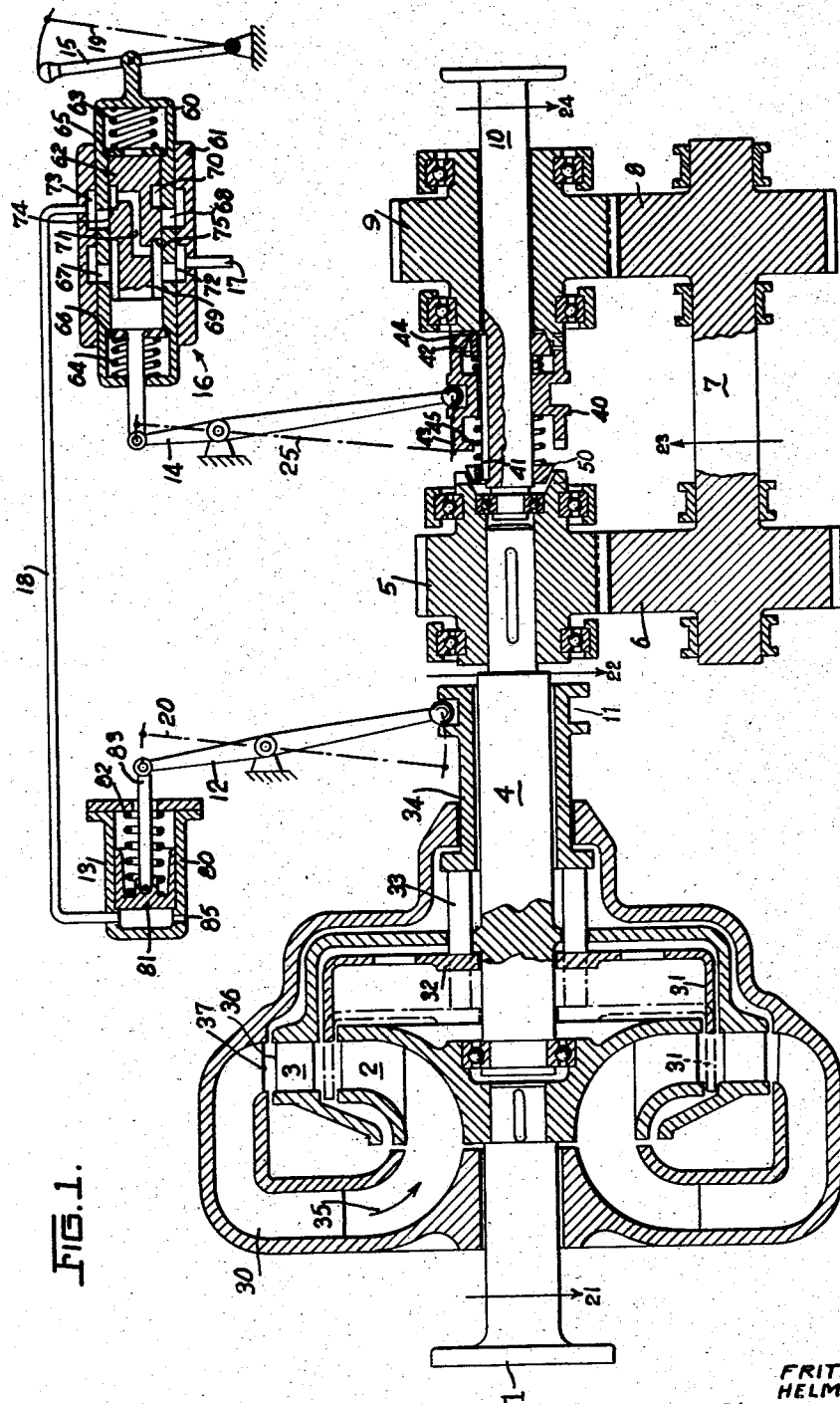
Figure 1 is a longitudinal sectional view illustrating a structure according to the invention, which comprises a torque converter with an annular slide valve used as disconnecting mechanism, and a gear change transmission system which has a plurality of gears constantly interengaged, and jaw clutch members adapted to be prevented, by frictional elements, from engaging each other.

Referring to the drawings in detail, the hydraulic power transmissions shown in Figures 1, 6 and 7 have in common an input shaft 1 adapted to be driven by a motor, not shown in those figures. The pump wheel 2 of the hydraulic circuit constituting the disconnecting mechanism cooperates with a turbine wheel 3. The output shaft 4 of the hydraulic power transmission constitutes the input shaft to the gear change transmission system, which, merely for purposes of simplifying the drawings, is shown as a two-speed gear transmission system. It is to be understood that the invention is by no means limited to the employment of a two-speed gear transmission and that the gear transmission shown in the drawings may be replaced by any other convenient system of any desired number of speeds.

Rigidly connected with the output shaft 4 is the gear 5 in constant mesh with the gear 6 rigidly connected to the countershaft 7. The countershaft 7 has rigidly connected thereto a second gear 8 in constant mesh with the low speed gear 9 rotatable with respect to the output shaft 10. The output shaft 10 is axially aligned with the output shaft 4 and is adapted, by means of a clutch, to be connected in direct drive with the shaft 4 through the gear 5 or in indirect drive through the low speed gear 9 and countershaft 7. The directions of rotation of the various shafts are indicated by the arrows designated 21, 22, 23 and 24, respectively.

The disconnecting mechanism is actuated by means of a servomotor 13, operating a lever 12 and a slidable sleeve 34. This kind of actuation of the disconnecting mechanism is, of course, merely given by way of example, and it is to be understood that the invention is not limited to the particular structure of the disconnecting mechanism shown in the drawings. It is also possible to connect to the lever 12 a link or link system 160, as shown in Figure 4, which controls the supply of fuel to the motor 161 for driving the input shaft 1.

The shifting of the sleeve clutch 40 along the shaft 10 between the gears 5 and 9 may be effected by a lever 14 which is yieldingly connected with the gear shift lever 15. The position of the lever 14 always represents the actual-position of the clutch, while the position of the shift lever 15 indicates the x position of the clutch, i. e., the position which the clutch should occupy at the completion of the shifting operation. In accordance with the divergence between the x-position and the actual-position, the control mechanism 16 will control the controlling fluid for the operation of the servomotor 13.

The controlling fluid for the servomotor 13 is supplied to the controlling mechanism 16 by means of a pressure fluid source, for instance, a gear pump, through a conduit 17 and is conveyed through conduit 18 to the servomotor 13.

While the shift lever 15 is illustrated in the drawings as a manually operable lever, it is of course understood that any other kind of shifting element or mechanism may take the place of said manually operable lever.

For example, instead of a manual shift lever, the arrangement shown in Figure 5 may be employed, wherein the output shaft 10 is coupled to a shaft 161a having keyed thereto a bevel gear 162 meshing with a bevel gear 163. The bevel gear 163 is keyed to a rotatable shaft 164 of a governor 165. The governor 165 comprises a collar 166 fixed to shaft 164 and a collar 167 slidably mounted on the shaft 164. The collar 167 has pivotally connected thereto arms 168 with weights 169, whereas the collar 166 has pivotally connected thereto arms 170 which in their turn are pivoted to the arms 168. A spring 171 interposed between the collars 166 and 167 continuously urges the collar 167 away from the collar 166. The collar 167 has a groove 172 slidably engaged by one arm of a bell crank lever 173, the other arm of which is pivotally connected to the piston 60a which in its construction fully corresponds to the piston 60 of the control mechanism of Figure 1, which is described hereinafter. As will be clear from the drawing, increase in the speed of the output shaft 10, causes weights 169 to move outwardly, thereby causing lever 173 to move in a clockwise direction so as to effect a shifting movement of piston 60a toward the right in Figure 5, and the servo-motor is operated accordingly.

Referring again to Figure 1, wherein the gear change transmission system has associated therewith an ordinary torque converter, the fluid flows from the pump wheel 2 to the turbine wheel 3, then to the guide wheel 30 and back to the pump wheel 2.

The disconnecting mechanism of Figure 1 comprises an annular slide valve 31 which is shown in full lines its inoperative or open position, and in dot and dash lines in its operative or closed position. The slide valve 31 is supported by and connected to the sleeve 34 by means of bolts 33. The sleeve 34 is provided with an annular recess 11 which is engaged by the lower end of the lever 12. The torque converter is, as a rule, continuously filled with driving fluid.

In the open or ineffective position of the annular slide valve 31 the fluid in the converter circulates as indicated by the arrow 35, without being substantially impeded. In the operative or closed position of the annular slide valve 31, however, the circulation of the fluid between the wheels 2 and 3 is interrupted, the output shaft 4 can, therefore, receive a torque only insofar as the annular slide valve 31 is carried around by the fluid acting upon the inside of the valve 31 and circulated by the pump wheel 2. On the other hand, strong whirls are created between the exit edge 36 of the turbine wheel 3 and the entrance edge 37 of the guide wheel, which whirls use up a torque greater than that exerted by the primary side. In the arrangement of Figure 1, the braking effect will, therefore, as a rule, be sufficient and will not require an additional braking mechanism, provided the distance between the turbine wheel exit and the guide wheel entrance is not too great.

The clutch mechanism associated with the gear change transmission system of Figure 1 is shown on an enlarged scale in Figure 2, and in section in Figure 3.

This clutch mechanism comprises a sleeve 40, which is splined by means of a key 41 on the shaft 10. The clutch 40 has two jaw assemblies 42 and 43 provided with extensions 44 and 45, respectively, and an annular recess 46 engaged by the lever 14. The gear 9 is provided with jaws 47 adapted to engage the jaws 42 of the clutch, while the gear 5 is provided with jaws 48 adapted to engage the jaws 43 of the clutch. The jaw assemblies 47 and 48 have conically shaped recesses adapted to receive the spacer rings 49 and 50, which have their outer peripheries provided with longitudinally arranged grooves 51 and 52. The spacer rings 49 and 50 are pressed, by means of springs 53 and 54, against adjacent walls in the conically shaped recesses and are rotatably connected to the shaft 10 by means of the key 41. It should be noted that the groove 55 in the clutch, as shown in Figure 3, is wider than the key 41.

Referring now to the controlling mechanism 16, the outer piston 60 is slidably mounted in the casing 61 and is pivotally connected with the gearshift lever 15. The inner piston 62, which is pivotally connected to the lever 14, is slidably mounted within the piston 60. The pistons 60 and 62 are yieldably held in a relative position by means of the springs 63 and 64, which predetermined position will hereinafter be called "intermediate-position." The spring discs 65 and 66 respectively abut two shoulders in the bore of the piston 60. The pistons may move relative to each other only by compressing one of the two springs. The compressed spring will then always tend to reestablish the intermediate-position.

The piston 60 is provided with two rows of ports 67 and 68. The piston 62 has two annular recesses 69 and 70 connected with each other by a passageway 71. The casing 61 has two annular recesses 72 and 73 respectively connected to the conduits 17 and 18.

The ports 67 are provided for establishing communication between the recess 72 which is connected to the conduit 17 and the annular recess 69 in the inner piston. The recess 70 is, through channel 71, continuously subjected to the fluid pressure in line 17. When the pistons 60 and 62 are in their intermediate position, the recess 70 is cut off by the piston 60. In all other positions, the recess 73 communicates through the ports 68 with the recess 69 or 70. The oil pressure in conduit 17 can then pass to the conduit 18.

The servomotor 13 comprises a cylinder 80, a piston 81 slidably mounted therein, and a spring 82 acting upon said piston to urge the same toward the left in Figure 1. The cylinder 80 has a discharge port 85 which is small in diameter in comparison to the diameter of the conduit 18.

The device shown in Figures 1, 2 and 3 operates as follows:

It is assumed that the device is, as shown in the drawings, so adjusted that the low speed is effective. It is further assumed that the slide valve 32 has been withdrawn to open position and is maintained by spring 82 in this position. It is also assumed that the clutch 40 is in its right hand position wherein it engages the jaws 47 of the low speed gear 9 so that the power is conveyed from the shaft 4 through gear 5, gear 6, countershaft 7, gears 8 and 9, jaws 47 and 42, clutch 40 and key 41 to the shaft 10.

If the levers 14 and 15 are in the position shown in Figure 1, and the pistons 60 and 62 of the control mechanism are in the intermediate-position, it is desired to shift from the first to the second speed, i. e., from low speed to high gear, the lever 15 is moved into the position indicated by the dot-and-dash line 19. Due to this shifting of the lever 15, the piston 60 moves toward the right and causes a compression of the spring 64, while the position of the piston 62 at first remains unchanged because the thrust of the spring 64 is not sufficient to disconnect the jaws 42 and 47 of the clutch 40 since the jaws 42 and 47 are still pressed against each other by the torque imposed upon said jaws. However, inasmuch as the pistons 60 and 62 have moved relative to each other, the ports 68 have moved past the controlling edge 74 toward the right, thereby establishing hydraulic connection between the conduit 17 and the servomotor 13 through the conduit 18.

This causes the piston 81 to move toward the right while the lever 12 moves into the position indicated by the dot-and-dash line 20. Because of the connection of the piston 81 with the annular slide valve 31 by means of the linkage 83, 12 and the sleeve 34, the slide valve 31 moves toward the left to its closed position and interrupts the circulation of the fluid in the converter. Before the piston 81 completed its stroke, the slide valve 31 reaches its neutral-position. At this instant the clutch jaws 42 and 47 are relieved of their load.

The sleeve 40 in being moved toward the left by the thrust of the spring 64 can move only until the outer face 56 of the extension 45 engages the outer face 57 of the spacer ring 50. The reason for this is that in first gear speed shaft 10 rotates with a speed lower than that of the high speed gear 5. During the shifting operation, at about the intermediate-position of the clutch 40, the spring 54 has become loaded, so that the spacer ring 50 is pressed against the gear 5. The gear 5 has the tendency, due to friction between the gear 5 and the spacer ring 50, to carry the latter around. This, however, is possible only to a limited extent, i. e., until the side 58 of the groove 55 abuts the key 41.

In this position of the spacer ring 50, the groove 52 has moved into a position opposite to the extension 45 on the clutch 40 and the outer faces 56 and 57 of the spacer ring 50 and the clutch engage each other. Simultaneously, the piston 62 is moved toward the intermediate-position by about two-thirds of its entire stroke. With the pressure fluid, still passing by the controlling edge 74 to the conduit 18, that the piston 81 moves to the extreme right and the annular slide valve 31 is thereby moved into its fully closed position. As a result, the braking effect of the blade edges 36 and 37 becomes effective, whereby the speed of the shaft 4 is reduced.

When the speed of rotation of the shaft 4 and of the output shaft 10 are about equal, or if the rotating speed of the shaft 4 begins to become less than the rotating speed of the output shaft 10, the spacer ring 50 is carried around in the opposite direction. At the moment at which the ring 50 moves relative to the clutch 40 to the position shown in Figure 3, the extension 45 passes into the groove 52 and the jaws 43 and 48 become engaged with each other.

As the clutch 40 moves into its extreme left-hand position and the lever 14 moves into the position designated by line 25, the two pistons 60 and 62 again reach their intermediate-position, and the x-position and actual-position of the clutch become the same, so that the disc 66 again abuts the shoulder in the bore of the piston 60, while the controlling edge 74 again closes the ports 68 so that no more fluid is passed through the conduit 18 to the servo-motor 13.

The fluid in the cylinder of the servo-motor 13 is discharged by the thrust of the spring 82 which forces the fluid out through the opening 85. The piston 81 is returning to the position shown in Figure 1, returns the annular valve 31 to its open position, shown in Figure 1. As a result, the converter again conveys a torque through the output shaft 4, gear 5, jaws 48 and 43, clutch 40 and key 41 to the shaft 10.

The opposite shifting operation, that is, from high speed to low direction, i. e., from higher speed to lower speed gear is effected substantially in the same manner. It differs from the shifting operation described above only in that after the declutching of the previously engaged jaws 43 and 48, and after engagement of the spacer ring 49 by the clutch 40, passage of fluid through the ports 68 is interrupted by the controlling edge 75, thereby initiating the opening movement of the annular valve 31. The reason for this is that, in order to obtain equalization, the speed of rotation of the shaft 4 must be increased with respect to its previous speed. In other words, the braking effect, when the annular valve 31 has reached its fully closed or effective position, is not made use of. As soon as equalization has been obtained, the jaws 42 and 47 again engage each other and the further increased torque is conveyed through the countershaft 7 to the shaft 10.

Only one embodiment has been described for hydraulically actuating the slide valve 31 by means of the controlling mechanism 16. It should, however, be noted that, if desired, the piston 81 could be hydraulically controlled in both directions by providing two conduits between the controlling mechanism 16 and the servomotor 13. The pistons 60 and 62 would then be so constructed as to also control also the returning fluid.

Referring now to Figure 6, the embodiment shown therein likewise comprises a gear change transmission system in connection with an ordinary torque converter. This torque converter also comprises three blade assemblies involving the pump wheel 2, turbine wheel 3, and the guide wheel 30, respectively. The disconnection of the power transmission in this embodiment is effected by withdrawing the turbine wheel 3 from the hydraulic circuit by moving the turbine wheel in axial direction. To this end the hub 90 supporting the disc 91 of the turbine wheel 3, is slidably mounted on the shaft 4 but is prevented from rotating relatively to the latter. The hub 90 is provided with an annular recess 11 slidably engaged by the lever 12. In this arrangement also the converter is, as a rule, filled with driving fluid. As long as the input or driving shaft 1 rotates, fluid is rotating in the converter in the direction indicated by the arrow 35.

When the turbine wheel 3 is in the operative position shown in Figure 6, it is acted upon by the circulating fluid and, therefore, conveys a torque to the shaft 4. However, when the turbine wheel 3 is in its inoperative or withdrawn position, indicated in dot-and-dash lines in Figure 6, substantially no torque is conveyed to the output shaft 4.

Since the friction on the wall of the converter elements is, as a rule, not sufficient to cause a fast decrease in the speed of shaft 4, a stationary auxiliary blade assembly 92 is provided, which is located opposite the blades of the turbine wheel 3 when the turbine wheel is in its inoperative position, so as to exert a braking torque upon the turbine 3 and, thereby, upon the output shaft 4. The employment of such a converter with slidable turbine wheel has the particular advantage that the circulation of the fluid in the converter continues, and that the motor, during the entire shifting operation, still may continue to exert its full power upon the pump wheel so that no variations in its speed of rotation occurs. The shifting operation of the gear change transmission system is effected by a two-side spacer clutch of well known type.

The clutch 100 is longitudinally slidable on the shaft 10 but prevented from rotating relative thereto. The clutch 100 is provided with two rows of jaws 101 and 102 with slant front faces. The front faces of the jaws 103 and 104 provided on the gears 9 and 5 are similarly inclined, this arrangement being provided for preventing meshing of the jaws until the speeds of the elements to be interconnected have been equalized. Since the controlling mechanism 16 and the servomotor 13 of Figure 6 are supposed to be of the same construction as that shown and described in connection with Figure 1, the gear shifting operations are effected in the manner as described above in connection with Figure 1. The function performed by the spacer rings in Figure 1 is performed by the spacer surfaces or slant front faces of the jaws 101, 102, 103 and 104. When the jaws 101 are disengaged from the jaws 103, the front faces of the jaws 102 and 104 slide upon each other as long as the turbine wheel 3 runs faster than the shaft 10. The clutch ratchets. When equalization of the speeds of rotation has been obtained, or the speed of the shaft 10 slightly exceeds that of the shaft 4, the slant surfaces act in the reverse direction and cause the jaws 102 and 104 to mesh with each other.

In Figure 7 is shown an embodiment consisting of a compound power transmission which comprises two mechanical and two hydraulic speeds. The hydraulic power transmission system comprises a torque converter with pump wheel 110, turbine wheel 111 and guide wheel 112, and further comprises a hydraulic coupling with pump wheel 2 and turbine wheel 3. The shifting of the hydraulic circuits is effected by discharging one and filling another hydraulic circuit.

The mechanical gear change transmission system illustrated in Figure 7 also has two speeds, although, as previously mentioned, a mechanical gear change transmission with more than two speeds may be used. The shifting of the said gear change transmission is intended only when the hydraulic coupling is filled. The compound power transmission may, therefore, be operated selectively in any one of the following combinations:

1. Torque converter, first speed,
2. Coupling, first speed,
3. Coupling, second speed.

Therefore, only the coupling is provided with a disconnecting mechanism which, by way of example, is shown in Figure 7 as an assembly of shiftable blades 113. These shiftable blades are arranged in the turbine wheel 3 and journalled therein by means of the blade pivots 114. The blade pivots 114 are provided with pinions 115 which, by means of intermediate pinions 116 arranged on the secondary wheel 3, mesh with the gear 117 which is rotatably mounted on the shaft 4 but is prevented from moving axially relative to the shaft 4.

The hub of the gear 117 is provided with a thread 118 adapted to mesh with a corresponding thread in the sleeve 119, which is provided with an annular recess 11 slidably engaged by the lever 12. The sleeve 119 is mounted on the shaft 4 so as to be axially movable relative thereto, but is prevented from rotating relative to the shaft 4.

Figure 7 shows the shiftable blades 113 in their inoperative position, whereas Figure 8 shows the blades 113 in their operative position. The coupling has no stationary parts so that no braking effect can occur therein. However, the coupling effect cannot be completely eliminated, since whirls occur on the blade edges 119a, 120, 121 and 122, which cause rotation of the coupling elements to a certain extent.

Therefore, according to the invention, additional braking means is provided by mounting on the rotating casing of the coupling a blade wheel 123 for a small hydraulic brake. Opposite to the wheel 123 there is located a blade assembly 124 which is fixed with respect to the guide wheel 112 and is surrounded by the rotatable annular portion 125. In normal operation, the channel defined by the elements 123, 124 is empty. During the speed shifting operation of the gear change transmission system, when the hydraulic circuit is interrupted, the braking mechanism is provided with fluid from the coupling, the fluid passing through grooves 126 in the blade pivots 114 and through bores 127 in the coupling casing when the pivots are turned to the proper position. The blade pivots 114, therefore, act as shiftable valves.

When, during the shifting operation, the blades 113 are returned to their inoperative position, the admission of fluid to the brake means is interrupted so that the same is emptied through the bores 128.

Another braking arrangement is indicated in dot-and-dash lines in Figure 7, wherein the sleeve 119 may be provided with a braking disc 129, while a yielding member is interposed between the sleeve 119 and the disc 129. The disc 129 is adapted in the right hand position of the sleeve 119 to engage a brake surface 130 in the casing, to produce the desired braking action.

The clutch for effecting the speed change in the gear change transmission system is shown in Figure 7 as an automatic clutch of a well known type wherein only the locking of the clutch is controlled from the outside. Mounted on the shaft 10 is a thread 140 with high pitch which engages a corresponding thread in a sleeve 141.

The sleeve 141 is provided with a jaw assembly 142 and two pawls 143 and 144, as well as with a tooth 145. The jaw assembly 142 is adapted to mesh with the jaw assembly 146 on the gear 9 or with the jaw assembly 147 on the gear 5. The pawl 143 has its point directed toward the reader. In the intermediate-position of the sleeve 141, the pawl 143 is located opposite the jaw assembly 147. If the jaw assembly 147 runs faster than the shaft 10, the pawl 143 will ratchet. If the jaw assembly 147 runs slower than the shaft 10, the pawl 143 comes into operation and causes the sleeve 141 to move into its left end position. The pawl 144 is associated with the jaw assembly 146 and has its point directed away from the reader. As long as the gear 9 runs slower than the shaft 10, the pawl 144 ratchets; but when the gear 9 runs faster than the shaft 10, the pawl 144 comes into operation and pulls the sleeve into the extreme right hand position.

The locking sleeve 148 with its teeth 149 slides on the teeth 145 of the sleeve 141. Furthermore connected to the shaft 10 is the hub 150, which is provided with locking teeth. Bolts 152 engage the annular groove 151 of the locking sleeve 148. The bolts 152 are connected to the sleeve 153 and extend through slots formed in the cylindrical portion carrying the jaw assembly 147. The sleeve 153 itself is shiftable by means of the lever 14 which engages an annular groove in the sleeve.

The shifting from low gear to high gear, the parts being in the position shown in Figure 7, is effected as follows:

When the gearshift lever 15 is shifted toward the right, the locking sleeve 148, with sleeve 153 and lower lever portion 14, immediately moves toward the left until the front face of the teeth 149 abuts the right front face of the hub 150. The servomotor 13 then receives fluid through the controlling mechanism 16 and the lever 12 and, with the latter, the entire mechanism including the blades 113, move into a position for interrupting the hydraulic circuit, whereby the power transmission is interrupted and the channel 123, 124 of the hydraulic braking means is filled with fluid.

Due to the resultant braking torque, the sleeve 141 threads itself into intermediate position and the pawl 143 ratchets on the jaws 147. At this time, the gear 5 still moves faster than the shaft 10. When the speed of the gear 5 has been decreased by means of the brake to such an extent that the gear 5 starts moving slower than the shaft 10, the pawl 143 becomes effective and pulls the sleeve 141 toward the left until the jaws 142 and 147 mesh, in which position the teeth 149 engage the teeth 150 and the sleeves 148 and 153 move toward the left, and the lever 14 occupies the position indicated by the dot-and-dash line 25.

The pistons of the controlling mechanism 16 then return to their intermediate position and the servomotor 13 is without pressure. The lever 12 returns to the position shown in solid lines and the blades 113 and valve pivots 114 return to open position. Torque is then conveyed through shaft 4, gear 5, jaws 147 and 142, sleeve 148 and hub 150 to the shaft 10.

In changing from high gear to low gear is effected, the lever 14 does not at once follow the lever 15 because the locking sleeve 148 is loaded by the torque.

Only when the torque becomes substantially zero by movement of the blades 113 into effective or interrupting position, does the locking sleeve 148 jump out, but at this time cannot yet occupy the position shown in solid lines in Figure 7. As described in connection with Figure 1, the servomotor 13 begins at this point to lose its pressure so that the valve blades 113 open again. As a result, the shaft 4 begins to accelerate and, at the attainment of substantial equalization of the speeds of shafts 4 and 10, all parts again occupy the positions shown in Figure 7.

It will be understood that we desire to comprehend within our invention such modifications as come within the scope of the appended claims.

Having thus fully described our invention, what we claim as new and desire to secure by Letters Patent is:

1. In a hydromechanical compound power transmission system, a torque converter comprising a pumping blade assembly, a turbine blade assembly and a guide wheel blade assembly, a mechanical power transmission having a plurality of speed transmitting elements, an output shaft drivingly connected to the turbine blade assembly of said converter and also drivingly connected to the input side of said mechanical power transmission, mechanical means for selecting two transmitting elements for driving engagement with each other, a braking blade assembly, and means operated by said mechanical means for moving said turbine blade assembly into a position for cooperating with said brake blade assembly to effect a fast slow-down of said output shaft to bring about a speed equalization of the transmitting elements to be drivingly connected with each other.

2. In a hydromechanical compound power transmission system, a hydro power transmission including a hydraulic coupling, a mechanical power transmission having a plurality of speed transmitting elements, an output shaft connected to said coupling for conveying power from said coupling to the input side of said mechanical power transmission, a first brake element connected to said coupling, a second brake element operatively connected to said mechanical power transmission, mechanical means for selecting two transmitter elements for driving engagement with each other in correspondence to a desired speed, means for interrupting the coupling effect of said coupling, and means responsive to the operation of said mechanical means for engaging said brake elements with each other to bring about a slow-down movement of said output shaft for a speed equalization of the transmitter elements to be connected with each other.

3. In a hydromechanical compound power transmission system, a hydraulic torque converter comprising a pumping blade assembly, a turbine blade assembly and a stationary guide wheel, a brake blade assembly rigidly connected to said guide wheel but mounted outside the path of fluid within said guide wheel and said pumping blade assembly, a mechanical power transmission having a plurality of speed transmitter elements, mechanical means for selecting two of said speed transmitter elements for driving engagement with each other in accordance with the desired speed, an output shaft for conveying power from said converter to the input side of said mechanical power transmission, means drivingly connecting said turbine blade assembly to said output shaft and being axially slidable on said output shaft and control means operated by said mechanical means for selectively moving said turbine blade assembly into the path of circulating fluid in said converter or out of said path into cooperation with said brake blade assembly for slowing down the rotative movement of said output shaft to cause a speed equalization of the speed transmitter elements to be engaged with each other.

4. In a hydromechanical compound power transmission system, a hydraulic power transmission including a hydraulic coupling, a mechanical power transmission having a plurality of speed transmitting elements, mechanical means for selecting two of said transmitting elements for driving engagement with each other in accordance with a desired speed, an output shaft drivingly connected to said coupling and to the input side of said mechanical power transmission for conveying power from said coupling to said mechanical power transmission, hydraulic braking means associated with said coupling, and control means operable by said mechanical means to discharge fluid from said coupling to said braking means for causing operation of said coupling to slow down the rotative movement of said output shaft for a speed equalization of the transmitting elements to be drivingly engaged with each other, said control means also being operable selectively to interrupt hydraulic connection between said coupling and said brake for making the former effective and the latter ineffective.

5. In a hydromechanical compound power transmission system, a hydraulic transmission, a mechanical change-speed transmission having a plurality of speed transmitting elements, an output shaft connected to the output side of said hydraulic transmission for conveying power to said mechanical change-speed transmission, control having a first member movable into a plurality of positions corresponding in number to the available speeds in said compound power transmission and operable for selecting two of said transmitting elements for driving engagement with each other to provide a desired speed ratio, said control means having a second member movable for effecting driving connection between said selected transmitting elements, the position of said second member corresponding to the actual condition in said mechanical change-speed transmission and the position of said first member indicating the desired condition in said mechanical change-speed transmission, said control means having a third member associated with said hydraulic transmission and movable selectively into one position for slowing down the movement of said output shaft to cause a speed equalization of the speed transmitting elements for engagement with each other, and means responsive to a difference between said actual and said desired condition in said mechanical change-speed transmission for initiating movement of said third control member to effect a speed equalization between the speed transmitting elements to be connected with each other.

6. In a hydromechanical compound power transmission system, a hydraulic transmission, a mechanical change-speed transmission having a plurality of speed transmitting elements, an output shaft connected to the output side of said hydraulic transmission for conveying power to said mechanical change-speed transmission, control means having a first member movable into a plurality of positions corresponding in number to the available speeds in said compound power transmission and operable for selecting two of said transmitting elements for driving engagement with each other to provide a desired speed ratio, said control means having a second member movable for effecting driving connection between said selected transmitting elements, the position of said second member corresponding to the actual condition in said mechanical change-speed transmission and the position of said first member indicating the desired condition in said mechanical change-speed transmission, said control means having a third member associated with said hydraulic transmission and movable selectively into one position for slowing down the movement of said output shaft to cause a speed equalization of the speed transmitting elements for engagement with each other, means responsive to a difference between said actual and said desired condition in said mechanical change-speed transmission when a shifting operation from a higher to a lower speed is desired for initiating movement of said third member to effect a slow-down movement of said output shaft for a speed equalization of the speed transmitting elements to be engaged with each other, and means responsive to an agreement of said actual condition with said desired condition following initiation of a speed shifting operation from a lower speed to a higher speed for preventing said third control member from slowing down said output shaft following the disengagement of the transmitting elements preceding the driving engagement of the selected transmitting elements.

7. In a hydromechanical compound power transmission system, a hydraulic transmission, a mechanical change-speed transmission having a plurality of transmitting elements, an output shaft connected to said hydraulic transmission for conveying power to said mechanical change-speed transmission, a shifting element in said mechanical change-speed transmission for effecting a driving engagement between two desired transmitting elements, control means having a first member movable into a plurality of positions corresponding in number to the number of available speeds in said mechanical change-speed transmission, the position of said first member corresponding to the desired position of said shifting element, said control means having a second member for actuating said shifting element, the position of said second member corresponding to the actual position of said shifting element, said control means having a third member responsive to the movement of said first member with respect to said second member for initiating a slow-down movement of said output shaft to effect a speed equalization of the transmitting elements to be disengaged prior to the engagement of the speed transmitting elements subsequently to be engaged, and means responsive to the initiation of a shifting movement from a higher speed to a lower speed for making said third control member ineffective immediately following disengagement of said transmitting elements to be disengaged.

HELMUT BENZ.
FRITZ KUGEL.